(12) United States Patent
Madahar et al.

(10) Patent No.: US 8,856,598 B1
(45) Date of Patent: Oct. 7, 2014

(54) HELP CENTER ALERTS BY USING METADATA AND OFFERING MULTIPLE ALERT NOTIFICATION CHANNELS

(75) Inventors: Sachan Madahar, Cerritos, CA (US); Ilie O. Grigore, Irvine, CA (US); Kim Nga Thi Moore, Irvine, CA (US); Igor Belilovets, Irvine, CA (US)

(73) Assignee: Google Inc., Mountain View, CA (US)

( * ) Notice: Subject to any disclaimer, the term of this patent is extended or adjusted under 35 U.S.C. 154(b) by 438 days.

(21) Appl. No.: 13/204,584

(22) Filed: Aug. 5, 2011

(51) Int. Cl.
*G06F 11/00* (2006.01)

(52) U.S. Cl.
USPC ........................................................ 714/47.2

(58) Field of Classification Search
CPC .................... G06F 11/3419; G06F 11/3423
USPC ........................................................ 714/47.2
See application file for complete search history.

(56) References Cited

U.S. PATENT DOCUMENTS

| | | | |
|---|---|---|---|
| 7,340,654 B2 * | 3/2008 | Bigagli et al. | 714/47.2 |
| 8,090,974 B1 * | 1/2012 | Jain et al. | 714/3 |
| 8,140,915 B2 * | 3/2012 | Ohba et al. | 714/47.2 |
| 2005/0283788 A1 * | 12/2005 | Bigagli et al. | 719/318 |
| 2006/0156072 A1 * | 7/2006 | Khot et al. | 714/47 |
| 2008/0066072 A1 * | 3/2008 | Yurekli et al. | 718/104 |
| 2008/0263073 A1 * | 10/2008 | Ohba et al. | 707/101 |
| 2010/0021047 A1 * | 1/2010 | Hirai et al. | 382/145 |
| 2010/0153687 A1 * | 6/2010 | Koda et al. | 712/36 |
| 2011/0239057 A1 * | 9/2011 | Thimmappa et al. | 714/48 |

* cited by examiner

*Primary Examiner* — Joshua Lohn
(74) *Attorney, Agent, or Firm* — Fish & Richardson P.C.

(57) ABSTRACT

A system and machine-implemented method relating to identifying anomalous events by estimating a processing time for an operation, estimating a processing time for an operation; calculating a maximum threshold time based on the estimated processing time for indicating anomalous processing of the operation, periodically determining during processing of the operation an amount of processing time used to perform the operation; and sending a notification to a user indicating an anomalous run of the operation has occurred if the determined amount of processing time exceeds the maximum threshold time.

20 Claims, 3 Drawing Sheets

HELP CENTER ALERTS BY USING METADATA AND OFFERING MULTIPLE ALERT NOTIFICATION CHANNELS

BACKGROUND

In a high-volume online service environment, there is a need to identify, track, and process events that occur in the course of providing various services or features. As it is typical for millions of such events to be generated each day, these events are automatically generated, collected, and processed by computer systems. These events are typically processed periodically to generate reports useful for assessing the status of and managing the provided online services.

Of interest in the administration of online services are unexpected increases or reductions in traffic, whether for an online service as a whole, or for particular aspects of the online service, such as portions relating to customer service. Such changes in traffic volume may indicate a problem with the online service to which engineering or customer service-related resources need to be assigned for prompt resolution.

A conventional technique for assessing when such changes have occurred is the above-mentioned periodic generation of reports, in which events, whether stored in logfiles or otherwise, are processed to generate the reports. However, in view of the large number of events that are generated for a high-volume online service, the generation of such reports can require a significant amount of processing time. As a result, a significant amount of time may pass between an issue arising, and the detection or such an issue via this conventional technique for event processing.

SUMMARY

The disclosed subject matter relates to a method for identifying anomalous events, the method including estimating a processing time for an operation, calculating a maximum threshold run time, based on the estimated processing time, for indicating anomalous processing of the operation, and determining, during processing of the operation, an amount of processing time used to perform the operation. The method further including sending a notification to a user, the notification indicating an anomalous run time of the operation has occurred, if the determined amount of processing time exceeds the maximum threshold run time.

The disclosed subject matter further relates to a system for processing event information, the system comprising one or more processors and a machine-readable medium comprising instructions stored therein, which when executed by the processors, cause the processors to perform certain operations including estimating a processing time for an operation, calculating a maximum threshold run time, based on the estimated processing time, for indicating anomalous processing of the operation, and determining, during processing of the operation, an amount of processing time used to perform the operation. The instructions further cause the processor to perform the step of sending a notification to a user, the notification indicating an anomalous run time of the operation has occurred, if the determined amount of processing time exceeds the maximum threshold run time.

The disclosed subject matter also relates to a machine-readable medium comprising instructions stored therein, which when executed by a machine, cause the machine to perform operations including estimating a processing time for an operation, calculating a maximum threshold runtime and minimum threshold run time, based on the estimated processing time, for indicating anomalous processing of the operation, determining, during processing of the operation, an amount of processing time used to perform the operation and sending a notification to a user. The notification indicates an anomalous run of the operation has occurred, if the determined amount of processing time exceeds the maximum threshold run time or is less than the minimum threshold run time.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
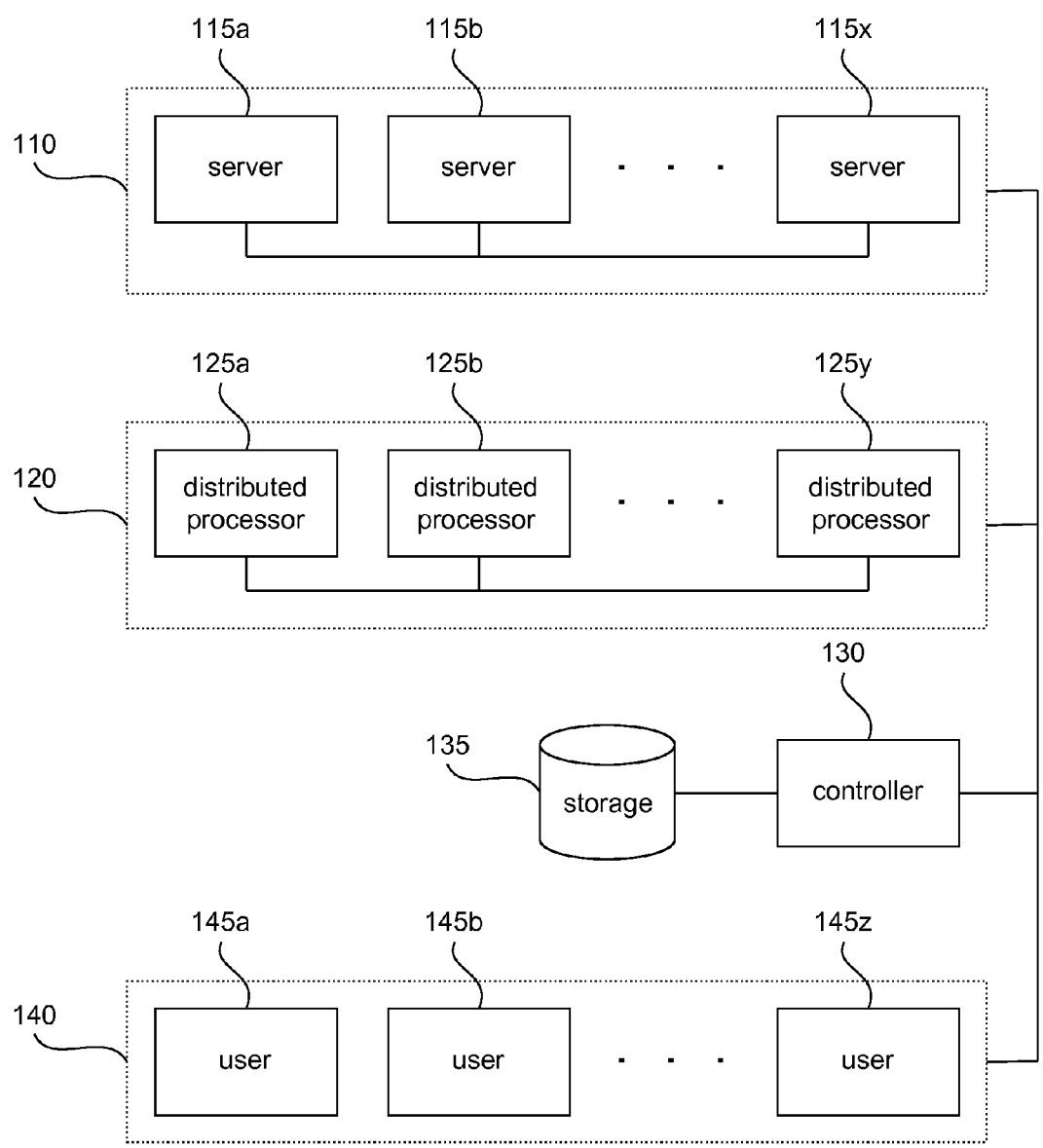
FIG. 1 illustrates an exemplary architecture diagram for detecting anomalous processing of an operation.

FIG. 1 illustrates an exemplary architecture diagram for detecting anomalous processing of an operation. Web service system 110 includes a plurality of servers 115a through 115x, which are used to provide a web-based computer service. Typically a portion of servers execute web server software for servicing Internet-originated requests sent to web service system 110. Each of the servers 115 is configured to record (e.g., via logfiles) and/or report events related to performing processing for web service system 110. Such events may include customer service-related activities, such as, but not limited to, the servicing of telephone support calls. The subject matter of this application relates to the processing of such events in order to identify issues relating to web service system 110.

A plurality of distributed processors 125 through 125y, are configured to provide a distributed processing system 120, which is used by controller 130 to process the events generated by servers 115. In some embodiments, such processing is performed periodically, for example, every six hours, once a day, once a week, or once a month. Such processing is used to generate reports of performance of activities relating to web service system 110, including, but not limited to, servicing requests sent to web service system 110 and providing customer service for web service system 110. These reports are used to manage operation of web service system 100, including the allocation of engineering resources and customer service resources. Such processing is often performed in large batches, operating on a significant number of events generated by web service system 100, which may take a significant amount of time to complete processing.

Controller 130 is a computer system used to perform portions of and coordinate various activities relating to the disclosed subject matter. For example, controller 130 may be configured to directly perform steps 205, 210, and 215 of process 200 described below, and also initiate performance of the operation described in step 220. Controller 130 is configured to make use of storage 135, which may be a component for controller 130, for recording information relating to the disclosed subject matter.

Social network 140 provides a social networking service used by a plurality of users 145a through 145z. Via social network 140, user 145a is able to post a status update, including a message, that may be seen by other users of social network 140 who have been associated with user 145a. Additionally, social network 140 provides mechanisms for shared commenting on status updates and direct communication between users. Users 145 may also be notified by other well-known means outside of social network 140, such as email, instant messaging, or text messaging via mobile telephone or computing devices.

Figure 2:
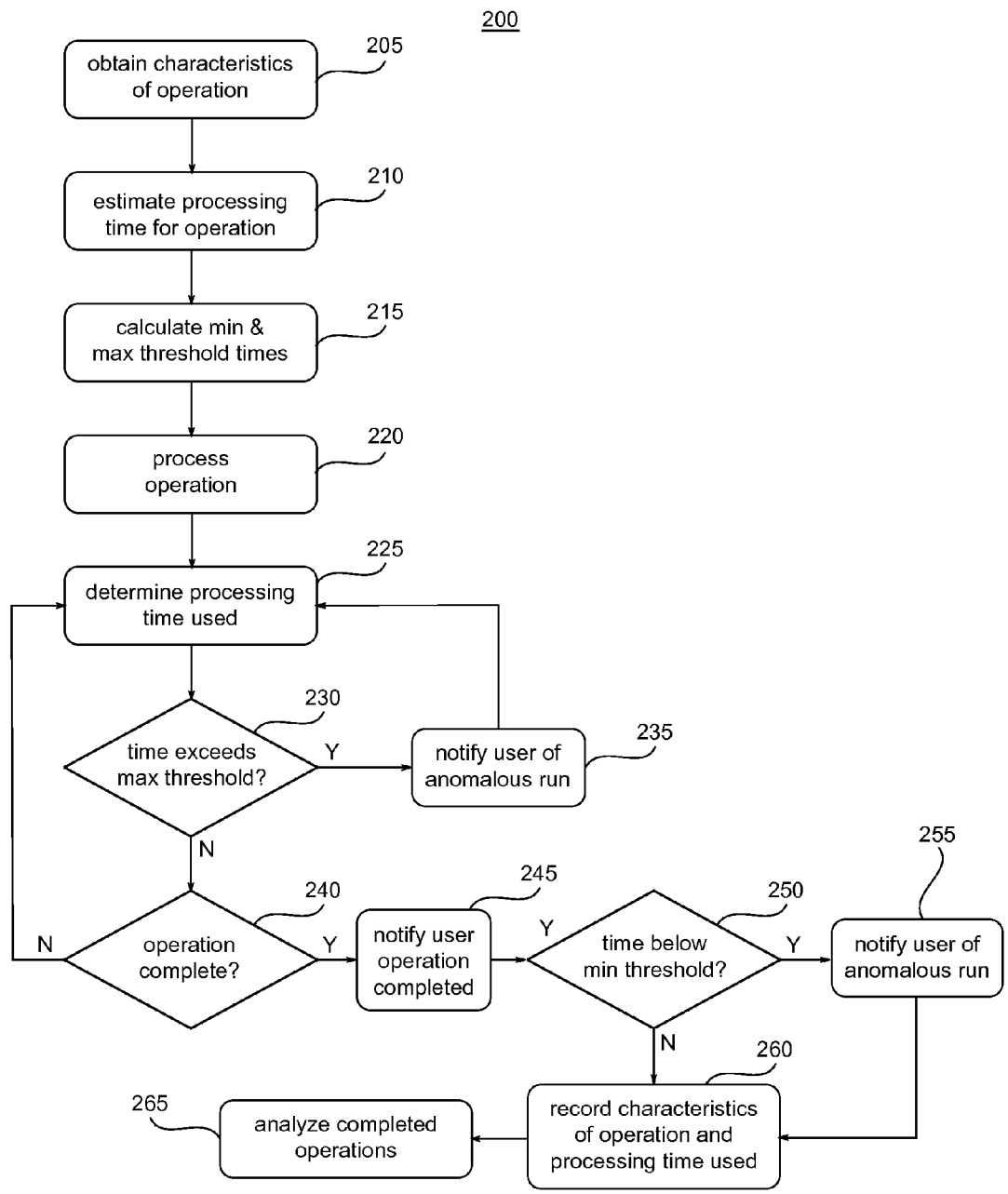
FIG. 2 illustrates an exemplary process 200 illustrating detection of an anomalous processing of an operation.

FIG. 2 illustrates an exemplary process 200 illustrating detection of an anomalous processing of an operation. At step 205, the operation is characterized by obtaining characteristics of the operation. The obtained characteristics include information which is used to more accurately compare different runs of an operation with one another, in the interest of making an accurate estimate of the time for the operation in view of such information and the time for completed runs of the operation. This information is used to, for example, normalize runs of an operation with each other. By way of example, if an operation is directed to processing events generated by a web-based email service, the number of users of the web-based email service, or the number of users who have made active use of the service during a period of interest, is likely to be useful information for estimating the time for the operation, as a change in the number of users might be expected to result in a proportional change in the number of events generated over a given period of time, and consequently the amount of time required for an operation to process such events. Another useful item of information is the period of time for which events are being processed. This might be recorded as a single scalar value (e.g., 2 days), or it might be recorded as a start and end time and date. By making use of a recorded date and time, it may be possible to improve an estimated time for an operation by compensating for cyclical trends such as increased usage of a service over weekends, or decreased usage during summer months. Generally, a change in the period of time being processed might be expected to result in a proportional change in the number of events generated over a period of time, and consequently the amount of time required for an operation to process such events.

In step 210, controller 130 calculates an estimate of the amount of processing time to perform the operation. In some embodiments, the processing time is calculated in terms of an abstract unit of computer processing time. For example, the amount of time that a system of a particular configuration is known to perform a particular operation. Use of an abstract unit of computer processing time allows for normalization of the actual time taken by systems of varying configurations. For example, a computer including more and/or faster processors will likely complete an operation in a shorter period of time. However, by techniques such as benchmarking the relative performance of systems may be measured, and used to normalize actual processing times into abstract units of computer processing time. Many standard benchmarks are well known in the art, although in some embodiments a particular operation or quantum of work may be performed that is considered a reasonable approximation of processing activities performed by process 200. Such normalization allows for different runs of operations to be effectively compared against one another, despite variations in processing resources utilized in performing each run. System configurations where such normalization may be of particular benefit include (1) where the operation is performed by a single system, which is subsequently upgraded to a more powerful system; and (2) where the operation is dynamically allocated among distributed processors included in a shared distributed processing system.

In some embodiments, the estimated processing time is calculated based on (1) recorded information about completed runs of the operation, such as measured processing time for completion and the characteristics of the operation discussed above with respect to step 205; and (2) the information obtained in step 205 for the operation that is to be run. More specifically, in view of the information obtained in step 205, the recorded information may be extrapolated to calculate an estimate of the processing time for the operation about to be performed. Various techniques for extrapolating an estimated value from known examples, such as multivariate regression analysis, are known within the art.

In step 215, the estimated process time calculated in step 210 is used as a basis for calculating a minimum threshold time, later used in step 245, and a maximum threshold time, later used in step 230. Where the measured processing time for the operation falls outside of the range defined by the minimum and maximum threshold times, a determination may be rendered that an anomalous period of processing time (either significantly more or less than the estimated process time calculated in step 210) has been used to process the operation, in which case a notification is issued at step 235 or step 250, as discussed in more detail below. In some embodiments, the minimum and maximum threshold times may be calculated by multiplication with a simple constant factor (e.g., the minimum threshold time is 80% of the estimated processing time, and the maximum threshold time is 125% of the estimated processing time). In some embodiments, this calculation may be based on a statistical assessment of completed runs of the operation. For example, not only is an expected processing time calculated, but also an expected standard deviation for this processing time, based on normalized information from completed runs of the operation. Based on this, the minimum threshold time might be calculated as the estimated processing time minus 1.8 times the standard deviation thereof, and the maximum threshold time as the estimated processing time plus 1.8 times the standard deviation thereof. Typically, manual tuning of the process employed to calculate the minimum and maximum threshold values is used to achieve a desired rate of notifications. For example, although the maximum threshold time may initially be calculated as 125% of the estimated processing time, over time it may be decided that a 150% factor may better indicate when anomalous processing has occurred, and thereby avoid "false positive" notifications.

In step 220, processing of the operation is performed. In some embodiments, the operation may be one of many operations that are being performed as part of a batch operation. For example, a particular operation of interest may relate to usage of a web-based service in the United States, but this operation is part of a larger set of operations acting upon worldwide logfile data, in which other operations relating to usage in other countries are also performed. In some embodiments, process 200 may also be applied to all or some of these other operations, such that anomalous processing may be detected for all such operations. One advantage in implementing the disclosed subject matter, whereby notifications are automatically issued for anomalous operations, for use with multiple operations, including sub-operations of a large batch process, is that it provides an infrastructure that readily accommodates converting larger operations into a plurality of smaller operations. This allows for the issuance of notifications which more specifically identify sources of possible new issues.

In some embodiments, the operation is performed using distributed processing system 120, comprising a plurality of distributed processors 125. Many techniques are known to those skilled in the art for performing distributed processing of operations. By way of example, the operation may be configured for processing using a MapReduce-based distributed computing framework. In some embodiments, the operation is processed by a single computer system.

In step 225, after a period of time a determination is made as to an aggregate amount of processing time that has been used to perform the operation. For example, this determination may be made approximately each a minute, although a higher or lower frequency might be used in view of, for example, the estimated processing time calculated in step 210. As another example, the operation may be performed in a series of phases or subdivided into multiple units of operation (such as where a larger operation is subdivided for distributed processing among multiple processors), after each of which the processing time may be determined. This determination may be made in terms of the same abstract units of computer processing time used in step 210, for comparison between the estimated processing time calculated in step 210 against the presently determined amount time spent processing the operation. In an embodiment where the operation is being performed by a single computer system, an operating system included may provide facilities for tracking processing time for tasks, as is well known in the art. In an embodiment where the operation is performed using distributed processing system 120, making a determination as to the amount of processing time is more complex, as the distributed processors 125 included in distributed processing system 120 may vary in processing capability, and processing of the operation may be dynamically allocated and reallocated among distributed processors 125. However, there are well-known techniques in the art for rendering the determination of step 225 on distributed computing platforms. For example, each distributed processor 125 may provide facilities for tracking processing time for a subdivided unit of the operation, which may be aggregated (with or without the normalization discussed above) with processing times determined for other subdivided units, whether processed on the same distributed processor or other distributed processors included in distributed processing system 120.

In some embodiments, the operation of interest for process 200 may be a subcomponent of a larger processing operation, or one result of many generated by the larger processing operation. Where the computing system used to perform the larger processing operation is unable to identify or report the processing time spent on the operation, but instead only provides the processing time for the larger operation, the processing time reported for the larger operation may be used as a proxy for the processing time of the operation, or a fraction (either predetermined or dynamically determined) of the processing time for the larger operation may be used as the processing time for the operation.

At step 230, a determination is made as to whether the processing time determined in step 225 exceeds the maximum threshold time calculated in step 215. If not, process 200 proceeds to step 240. However, if the maximum threshold has been exceeded, then process 200 proceeds to step 235. A particular advantage in making this determination in advance of the operation completing is that notification of a potential issue associated with the operation may be made in advance of the operation completing, thereby given additional time for resources to be directed at identifying and resolving of any such issue.

It is noted that the operation may not yet be completed at step 230. In an instance where it is determined that the time has exceeded the maximum threshold, and a notification is issued, in continued performance of process 200 steps 230 and 235 no longer need to be performed, and accordingly are skipped in further processing (e.g., once step 235 is performed, step 225 will begin advancing directly to step 240, rather than step 230). Additionally, once step 235 has been performed, it is known that steps 245 and 250 no longer need be performed; and accordingly they may be skipped later in process 200.

At step 235, a user 145a is notified that the operation has utilized a greater amount of processing time than expected. Such notification includes, but is not limited to, email, text messages, and instant messaging alerts. One or more users 145 may be notified. In some embodiments, interested users register their interest in receiving notifications with respect to operation. In some embodiments, users 145 may be notified by different mechanisms, determined based upon a mechanism specified in the course of registration.

In some embodiments, notification of user 145a is performed by use of a social network 140, such as, for example, Facebook or Google Buzz. In such embodiments, controller 130 makes a status update for user 145a via social network 140, indicating that the operation has utilized a greater around of processing time than expected, providing notification to user 145a. Via associations established via social network 140, user 145a is associated with users 145b and 145z in a manner that this status update causes users 145b and 145z to also be notified, indirectly via social network 140, that the operation has utilized a greater around of processing time than expected. By making this notification further available to users beyond 145a, it is possible to leverage knowledge or experience or other individuals associated with user 145a how expressed the initial and particular interest in receiving notifications. By way of example, users 145b and 145z may each be coworkers of user 145a. When made aware via social network 145 that the operation utilized a greater around of processing time than expected, user 145b may be aware of recent product changes or events that may have resulted in the operation utilizing a greater around of processing time than expected, and contact user 145a. Additionally, by indirect notification via social network 140, user 145z might be made aware of an issue that has an unexpected relationship to her own activities, where the issue may have otherwise been overlooked. Thus, use of social network 140 enables better identification and resolution of potential issues observed with the operation among a population of associated users. Although email aliases, in which an email to a single address results in the direct notification of a predefined set of users, also results in multiple users being notified, indirect notifications via social network 140, in which the indirect notifications are provided via informal networks established by the users, allows for problem identification and resolution to involve a broader (e.g., including users not expressly registered with controller 130) and more dynamic group of users.

In some embodiments, controller 130 is configured to provide an interface for users to identify and register for notifications for various operations processed by controller 130 in accordance with process 200. Via such an interface, users may register for individual operations, or combinations or groups of operations for which they wish to receive notifications. Additionally, users may indicate channels via which they wish to receive notifications, such as email, instant messaging, text messaging, and social network 140. Additionally, this interface may be integrated with an interface provided to register users interested in receiving reports, or notifications issued in response to such reports, generated by such operations. For example, when a user registers to receive notifications relating to the report generated by the operation, the user may also be automatically registered to receive notifications generated by process 200 in relation to the operation—or vice versa. Where social network 140 is used for notification, it is noted that broader categories of events may be more helpful, as users 145b and 145z associated with user 145a are less likely to be helpful with respect to operations that directly relate to work done by user 145a.

At step 240, it is determined whether the operation has been completed. If the operation is still being processed, process 200 continues at step 225, with the determination of step 225 typically made after waiting some period of time. If the operation has completed, process 200 continues with step 245.

In some embodiments, step 245 may optionally be performed. In step 245, if a user was notified in step 235 that the operation has taken more processing time than expected, a second notification may be sent to the user after completion of the operation. As the operation has completed, additional information about the processing of the operation is available at step 245. The second notification may indicate the total amount of processing time for the operation and the estimated processing time. Also, detailed information and statistics regarding the processing of the operation may also be included. The second notification allows the user to know when an anomalous operation has completed without having the user actively monitor the operation. By use of the two notifications, the user can begin preliminary efforts in addressing an anomalous operation with the first notification, and then switch to amore in-depth effort once the operation has completed.

In step 250, a determination is made as to whether the processing time determined in step 225, which reflects the total processing time used to complete the operation, is shorter than the minimum threshold time calculated in step 215. If not, process 200 proceeds to step 260. However, if the processing time is less than the minimum threshold, then process 200 proceeds to step 255. One example in which the processing time is shorter than expected is where the operation prematurely terminates; however, in such situations a separate mechanism is typically in place to detect and report premature termination, as premature termination often arises from an error in performing the operation itself, rather than an issue reflected in the information being processed by the operation.

In step 255, a user 145a is notified that the operation used less processing time than expected. Such notification is performed using the techniques discussed with respect to step 235. In some aspects of the disclosed subject matter, after this notification has been sent, a second notification may be sent to user 145a after completion of the operation, indicating a total amount of processing time for the operation and the estimated processing time, to allow user 145a more quickly assess the degree of deviation from the expected value.

It is noted that at step 250, the operation has been completed, and more detailed information may be available in the form of a detailed report generated by the operation. Thus, in some embodiments steps 250 and 255 are omitted, as the general notification 255 may be replaced by more specific notifications or analysis made available via a report generated by the operation.

In step 260, controller 130 stores information relating to the completed operation in storage 135 for later use. For example, the processing time determined in step 225 and characteristics of the operation obtained in step 205 may be stored for later use, mainly for the purpose of estimating the time for later runs of the operation. In some embodiments, step 210 may not rely on such information, in which case step 260 may be omitted.

In step 265, the corpus of information on completed runs of the operation recorded in storage 135, including from the most recent run of the operation, is analyzed in order to refine the estimates generated in step 210. In some embodiments, this analysis may further involve information stored for other operations. This step is not necessarily performed each time process 200 is performed, and may also be performed independent of process 200 (e.g., it might be performed once a month, whereas process 200 is performed daily). Also, such analysis may be incorporated into step 210, in which case little or no processing needs to be performed in step 265.

It is noted that although the above examples monitor whether the processing time for an operation is outside of an expected range, in some embodiments actual time (rather than processing time) may be monitored instead of, or in addition to, processing time. For some operations, a situation in which the actual time spent processing the operation exceeds an expected threshold may identify issues not identified by the use of just processing time. For example, if insufficient resources for the operation are provided by distributed processing system 120, there may be an underlying issue, such as a significant number of failed distributed processors 125, that needs to be addressed.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 3:
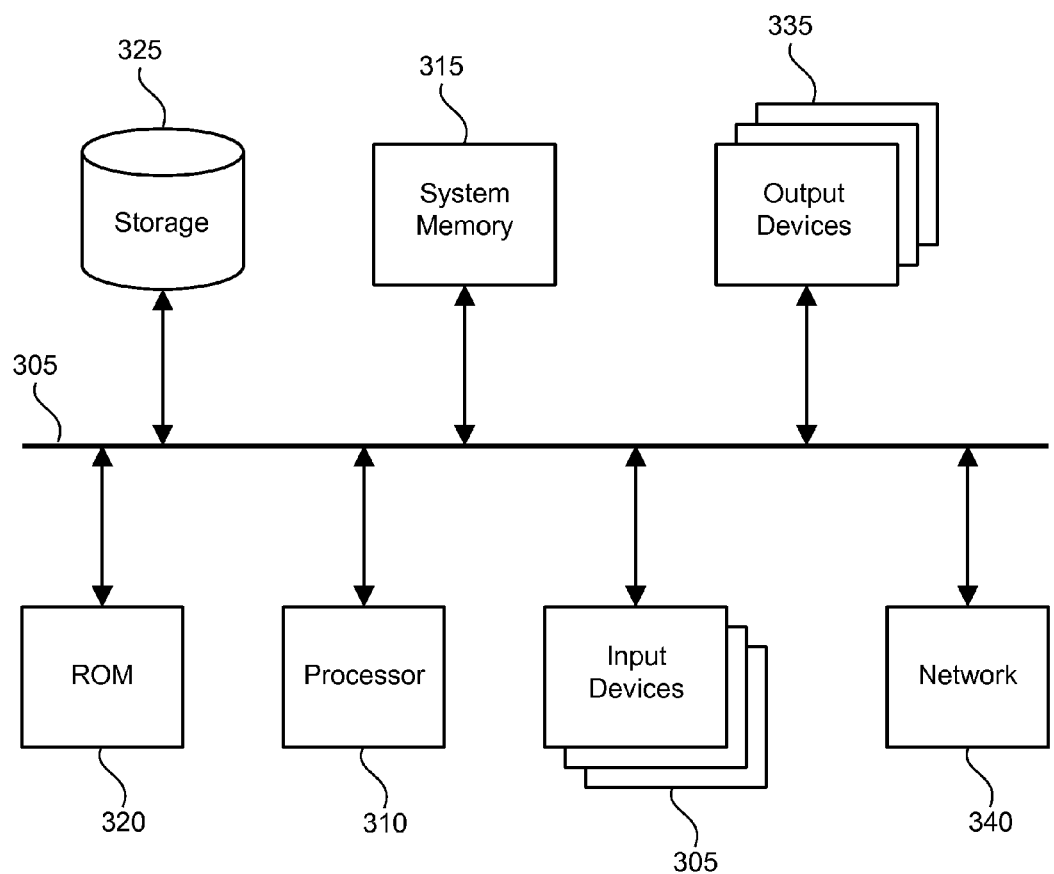
FIG. 3 conceptually illustrates an electronic system 300 with which some implementations of the subject technology are implemented

FIG. 3 conceptually illustrates an electronic system 300 with which some implementations of the subject technology are implemented. The electronic system 300 can be a computer, phone, PDA, or any other sort of electronic device. Such an electronic system includes various types of computer readable media and interfaces for various other types of computer readable media. Electronic system 300 includes a bus 305, processing unit(s) 310, a system memory 315, a read-only memory 320, a permanent storage device 325, input devices 330, output devices 335, and a network 340.

The bus 305 collectively represents all system, peripheral, and chipset buses that communicatively connect the numerous internal devices of the electronic system 300. For instance, the bus 305 communicatively connects the processing unit(s) 310 with the read-only 320, the system memory 315, and the permanent storage device 325.

From these various memory units, the processing unit(s) 310 retrieves instructions to execute and data to process in order to execute the processes of the invention. The processing unit(s) 310 can be a single processor or a multi-core processor in different implementations.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some implementations of the invention use a mass-storage device (such as a magnetic or optical disk and its corresponding disk drive) as the permanent storage device 325.

Other implementations use a removable storage device (such as a floppy disk, flash drive, and its corresponding disk drive) as the permanent storage device 325. Like the permanent storage device 325, the system memory 315 is a read-and-write memory device. However, unlike storage device 325, the system memory 315 is a volatile read-and-write memory, such a random access memory. The system memory 315 stores some of the instructions and data that the processor needs at runtime. In some implementations, the invention's processes are stored in the system memory 315, the permanent storage device 325, and/or the read-only memory 320.

For example, the various memory units include instructions for processing multimedia items in accordance with some implementations. From these various memory units, the processing unit(s) 310 retrieves instructions to execute and data to process in order to execute the processes of some implementations.

The bus 305 also connects to the input and output devices 330 and 335. The input devices enable the user to communicate information and select commands to the electronic system. The input devices 330 include alphanumeric keyboards and pointing devices (also called "cursor control devices"). The output devices 335 display images generated by the electronic system 300. The output devices 335 include printers and display devices, such as cathode ray tubes (CRT) or liquid crystal displays (LCD). Some implementations include devices such as a touchscreen that functions as both input and output devices.

Finally, as shown in FIG. 6, bus 305 also couples electronic system 300 to a network 340 through a network adapter (not shown). In this manner, the computer can be a part of a network of computers (such as a local area network ("LAN"), a wide area network ("WAN"), or an Intranet, or a network of networks, such as the Internet. Any or all components of electronic system 300 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration," Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for identifying anomalous events, the method comprising:
   receiving data specifying a time window over which logged events are to be processed;
   determining, based on the specified time window and historical information, a quantity of logged events that are expected to be received during the time window;
   estimating, prior to a beginning of the time window and based on the quantity of logged events, a processing time for an operation that will process the logged events after the beginning of the time window;
   calculating a maximum threshold run time, based on the estimated processing time, for indicating an anomalous run time of the operation;
   determining, during processing of the operation, an amount of processing time used to perform the operation; and
   sending a first notification to a user, the first notification indicating an anomalous run time of the operation has occurred, if the determined amount of processing time exceeds the maximum threshold run time.

2. The method of claim 1, wherein
   the notification is sent to the notified user via a social network which makes the notification viewable by other users associated with the notified user via the social network.

3. The method of claim 1, further comprising:
calculating a minimum threshold run time, based on the estimated processing time, for indicating anomalous processing of the operation;
determining a total amount of processing time used to complete the operation; and
sending a notification to the user, the notification indicating an anomalous run time of the operation has occurred if the total amount of processing time is less than the minimum threshold run time.

4. The method of claim 1, further comprising:
obtaining characteristics of the operation; and
recording the characteristics of the operation and a total amount of processing time used to complete the operation after completion of the operation, wherein
the step of estimating the processing time for the operation is based on recorded characteristics and total processing times for previous run times of the operation.

5. The method of claim 1, further comprising:
performing the operation with a distributed computing system comprising a plurality of distributed processors,
wherein the amount of processing time is based on an amount of processing time for the operation on each of the distributed processors.

6. The method of claim 5, wherein
the amount of processing time for the operation is determined based on normalizing an actual amount of processing time for each of the plurality of processors in view of a predetermined computing power for each of the plurality of processors.

7. The method of claim 1, further comprising:
determining a total amount of processing time used to complete the operation; and
sending a second notification to a user after completion of the operation if the first notification was sent to the user, the notification indicating the total amount of processing time for the operation and the estimated processing time.

8. A system for processing event information, the system comprising:
one or more processors; and
a machine-readable medium comprising instructions stored therein, which when executed by the processors, cause the processors to perform operations comprising:
obtaining characteristics of an operation;
receiving data specifying a time window over which logged events are to be processed;
determining, based on the specified time window and historical information, a quantity of logged events that are expected to be received during the time window;
estimating, prior to a beginning of the time window and based on the quantity of logged events, a processing time for an operation that will process the logged events after the beginning of the time window;
calculating a maximum threshold run time, based on the characteristics of the operation and the processing time, for identifying an anomalous processing of the operation; and
sending a first notification to a user, the first notification indicating an anomalous run time of the operation has occurred, in response to an amount of processing time for the operation exceeding the maximum threshold run time.

9. The system of claim 8, wherein
the notification is sent to the notified user via a social network which makes the notification viewable by other users associated with the notified user via the social network.

10. The system of claim 8, wherein the instructions further cause the processors to perform:
calculating a minimum threshold run time, based on the characteristics of the operation, for identifying an anomalous processing of the operation; and
sending a notification to the user, the notification indicating an anomalous run time of the operation has occurred, if a total amount of processing time used to complete the operation is less than the minimum threshold run time.

11. The system of claim 8, wherein the instructions further cause the processors to perform:
recording the characteristics of the operation and a total amount of processing time used to complete the operation, wherein
the step of calculating the maximum threshold run time is further based on recorded characteristics and total processing times for previous runs of the operation.

12. The system of claim 8, wherein the instructions further cause the processors to perform:
performing the operation with a distributed computing system comprising a plurality of distributed processors,
wherein the amount of processing time is based on an amount of processing time used for the operation on each of the distributed processors.

13. The system of claim 12, wherein
the amount of processing time for the operation is determined based on normalizing an actual amount of processing time for each of the plurality of processors in view of a predetermined computing power for each of the plurality of processors.

14. The system of claim 8, wherein the instructions further cause the processors to perform:
determining a total amount of processing time used to complete the operation; and
sending a second notification to a user after completion of the operation if the first notification was sent to the user, the notification indicating the total amount of processing time for the operation and the estimated processing time.

15. A non-transitory machine-readable medium comprising instructions stored therein, which when executed by a machine, cause the machine to perform operations comprising:
receiving data specifying a time window over which logged events are to be processed;
determining, based on the specified time window and historical information, a quantity of logged events that are expected to be received during the time window;
estimating, prior to a beginning of the time window and based on the quantity of logged events, a processing time for an operation that will process the logged events after the beginning of the time window;
calculating a maximum threshold run time, based on the estimated processing time, for indicating anomalous processing of the operation;
calculating a minimum threshold time, based on the estimated processing time, for indicating anomalous processing of the operation;
determining, during processing of the operation, an amount of processing time used to perform the operation; and
sending a first notification to a user, the first notification indicating an anomalous run time of the operation has occurred, if the determined amount of processing time exceeds the maximum threshold run time or a total amount of time is less than a minimum threshold run time.

16. The machine-readable medium of claim 15, wherein the notification is sent to the notified user via a social network which makes the notification viewable by other users associated with the notified user via the social network.

17. The machine-readable medium of claim 15, wherein the instructions further cause the machine to perform:
    obtaining characteristics of the operation; and
    recording the characteristics of the operation and a total amount of processing time used to complete the operation after completion of the operation, wherein
    the step of estimating the processing time for the operation is based on recorded characteristics and total processing times for previous runs of the operation.

18. The machine-readable medium of claim 15, wherein the instructions further cause the machine to perform:
    performing the operation with a distributed computing system comprising a plurality of distributed processors, wherein the amount of processing time is based on an amount of processing time for the operation on each of the distributed processors.

19. The machine-readable medium of claim 18, wherein the amount of processing time for the operation is determined based on normalizing an actual amount of processing time for each of the plurality of processors in view of a predetermined computing power for each of the plurality of processors.

20. The machine-readable medium of claim 15, wherein the instructions further cause the machine to perform:
    determining a total amount of processing time used to complete the operation; and
    sending a second notification to a user after completion of the operation if the first notification was sent to the user, the notification indicating the total amount of processing time for the operation and the estimated processing time.

* * * * *